United States Patent
Zhuang et al.

(10) Patent No.: US 12,542,705 B2
(45) Date of Patent: Feb. 3, 2026

(54) METHOD FOR SESSION PROTECTION AND SYSTEM

(71) Applicant: HUAWEI TECHNOLOGIES CO., LTD., Guangdong (CN)

(72) Inventors: Shunwan Zhuang, Beijing (CN); Haibo Wang, Beijing (CN); Mingqing Huang, Beijing (CN); Min Liu, Shenzhen (CN); Yunan Gu, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/343,807

(22) Filed: Jun. 29, 2023

(65) Prior Publication Data

US 2023/0336404 A1    Oct. 19, 2023

Related U.S. Application Data

(63) Continuation of application No. PCT/CN2021/142158, filed on Dec. 28, 2021.

(30) Foreign Application Priority Data

Dec. 30, 2020    (CN) .......................... 202011630706.8

(51) Int. Cl.
*H04L 41/0654*    (2022.01)
*H04L 41/0631*    (2022.01)
*H04L 67/141*    (2022.01)

(52) U.S. Cl.
CPC ...... *H04L 41/0631* (2013.01); *H04L 41/0654* (2013.01); *H04L 67/141* (2013.01)

(58) Field of Classification Search
CPC ... H04L 63/102; H04L 63/104; H04L 63/105; H04L 63/107; H04L 63/108; H04L 63/126; H04L 63/14
(Continued)

(56) References Cited

U.S. PATENT DOCUMENTS 7,760,733 B1 *    7/2010    Eiriksson ................ H04L 69/12
                                                        370/395.42
9,401,858 B2 *    7/2016    Francois ................. H04L 45/02
(Continued)

FOREIGN PATENT DOCUMENTS

| CN | 102404155 A | 4/2012 | |
| CN | 105591768 A | 5/2016 | |
| EP | 4142239 A1 * | 3/2023 | ......... H04L 41/0686 |

OTHER PUBLICATIONS

Angelique Medina et al:"CenturyLink / Level 3 Outage Analysis", Sep. 1, 2020, [online]https://blog.thousandeyes.com/centurylink-level-3-outage-analysis/, total 11 pages.
(Continued)

*Primary Examiner* — Khanh Q Dinh

(57) ABSTRACT

A method includes: determining that a failure occurs in a session between a first device and a second device; and sending, to the second device after the failure occurs, a first session establishment packet used to establish a new session, where the first session establishment packet carries capability information of the first device, and the capability information of the first device indicates that the first device does not have a capability of filtering a protocol packet for the new session.

17 Claims, 7 Drawing Sheets

(58) Field of Classification Search
USPC .................. 709/220, 224–228, 224–229
See application file for complete search history.

(56) References Cited

U.S. PATENT DOCUMENTS

| | | | | |
|---|---|---|---|---|
| 9,426,062 | B2* | 8/2016 | Fiorone | H04L 45/50 |
| 9,485,150 | B2* | 11/2016 | Filsfils | H04L 45/74 |
| 9,998,247 | B1* | 6/2018 | Choudhury | H04J 3/0667 |
| 10,757,020 | B2* | 8/2020 | Morris | H04L 49/901 |
| 12,034,588 | B1* | 7/2024 | Lo | H04L 45/851 |
| 12,155,569 | B1* | 11/2024 | Cirkovic | H04L 45/66 |
| 12,362,990 | B2* | 7/2025 | Lo | H04L 43/10 |
| 2006/0164995 | A1 | 7/2006 | Djernaes et al. | |
| 2008/0279097 | A1* | 11/2008 | Campion | H04L 65/80 370/229 |
| 2013/0336116 | A1* | 12/2013 | Vasseur | H04L 45/125 370/235 |
| 2013/0336159 | A1* | 12/2013 | Previdi | H04L 45/50 370/254 |
| 2014/0204954 | A1* | 7/2014 | Nee | H04L 47/2441 370/401 |
| 2014/0271954 | A1* | 9/2014 | Zhao | A61K 36/70 424/756 |
| 2015/0117203 | A1* | 4/2015 | Filsfils | H04L 47/20 370/235 |
| 2016/0185750 | A1* | 6/2016 | Dull | A24B 13/00 514/274 |
| 2017/0026292 | A1* | 1/2017 | Smith | H04L 41/0631 |
| 2024/0223439 | A1* | 7/2024 | Lo | H04L 45/851 |

OTHER PUBLICATIONS

K. Lougheed et al:"A Border Gateway Protocol (BGP)", Network Working Group, Request for Comments: 1105, Jun. 1989, total 17 pages.

K. Lougheed et al:"A Border Gateway Protocol (BGP)", Network Working Group, Request for Comments: 1163, Jun. 1990, total 29 pages.

K. Lougheed et al:"A Border Gateway Protocol 3 (BGP-3)", Network Working Group, Request for Comments: 1267, Oct. 1991, total 35 pages.

Y. Rekhter et al:"A Border Gateway Protocol 4 (BGP-4)", Network Working Group, Request for Comments: 4271, Jan. 2006, total 104 pages.

P. Marques et al:"Dissemination of Flow Specification Rules",Network Working Group, Request for Comments: 5575, Aug. 2009, total 22 pages.

J. Scudder et al:"BGP Monitoring Protocol (BMP)", Internet Engineering Task Force (IETF), Request for Comments: 7854, Category: Standards Track, ISSN: 2070-1721, Jun. 2016, total 27 pages.

"Address Family Numbers", Internet Assigned Numbers Authority, (2023-12-22), [online]https://www.iana.org/assignments/address-family-numbers/address-family-numbers.txt, total 2 pages.

"Subsequent Address Family Identifiers (SAFI)", Internet Assigned Nos. Authority, (Mar. 19, 2024), [online]https://www.iana.org/assignments/safi-namespace/safi-namespace.txt, total 2 pages.

Extended European Search Report issued in EP21914423.5, dated Apr. 24, 2024, 8 pages.

* cited by examiner

METHOD FOR SESSION PROTECTION AND SYSTEM

CROSS-REFERENCE TO RELATED APPLICATIONS

This application is a continuation of International Application No. PCT/CN2021/142158, filed on Dec. 28, 2021, which claims priority to Chinese Patent Application No. 202011630706.8, filed on Dec. 30, 2020. The disclosures of the aforementioned applications are hereby incorporated by reference in their entireties.

TECHNICAL FIELD

The present disclosure relates to the field of communication technologies, and in particular, to a method for session protection and a system.

BACKGROUND

As networking becomes diversified, a transmission path of a service packet is controlled by deploying control protocols. Control information is transmitted according to these protocols through sessions established between network element devices. Session termination and session flapping often occur on a network. It is difficult to diagnose failures. This severely affects a network service.

SUMMARY

Embodiments of the present disclosure provide a method for session protection and a system, to resolve a problem that a network service is interrupted due to abnormal session termination or session flapping.

To resolve the foregoing technical problem, the technical solution of the present disclosure is implemented as follows:

According to a first aspect, an embodiment of the present disclosure provides a method for session protection, to determine that a failure occurs in a session between a first device and a second device. The first device sends, to the second device after the failure occurs, a first session establishment packet used to establish a new session, where the first session establishment packet carries capability information of the first device, and the capability information of the first device indicates that the first device does not have a capability of filtering a protocol packet for the new session. After determining that the session failure occurs in a network, to prevent network service interruption, the first device sends the first session establishment packet to the second device. The first session establishment packet carries the capability information of the first device. The capability information of the first device indicates that the first device does not have the capability of filtering the protocol packet for the new session. The new session established between the first device and the second device does not have the capability of filtering the protocol packet. In this case, the first device and the second device do not have the capability of filtering the protocol packet for the newly established session, so as to ensure that after the new session is established, that the protocol packet, for example, a session keepalive packet, is filtered by the first device or the second device and that the session is terminated are avoided. This ensures availability of a network service.

In a possible implementation, after the failure occurs, a second session establishment packet that is sent by the second device and that is used to establish the new session is received. The second session establishment packet carries capability information of the second device. The capability information of the second device indicates that the second device does not have the capability of filtering the protocol packet for the new session. The new session is established based on the first session establishment packet and the second session establishment packet. The new session does not have the capability of filtering the protocol packet. In this case, the first device and the second device do not have the capability of filtering the protocol packet for the newly established session, so as to ensure that after the new session is established, that the protocol packet, for example, the session keepalive packet, is filtered by the first device or the second device and that the session is terminated are avoided. This ensures the availability of the network service.

In a possible implementation, before sending the first session establishment packet to the second device, the first device performs failure analysis on the failure; and based on the failure analysis, the first device unsuccessfully determines a failure cause. After the first device determines the session failure, if the first device supports a local failure analysis function or cooperates with a session failure analyzer to perform failure analysis, the first device first performs failure analysis on the session failure. If the session failure is located, the first device obtains failure cause information, and the first device can recover the failure based on the failure cause, so that the network service returns to normal. If the session failure is not located, and the first device does not obtain the failure cause information, the first device unsuccessfully determines the failure cause, and the first device cannot recover the failure.

In a possible implementation, the first device cooperates with the session failure analyzer to perform failure analysis on the failure, and the first device establishes a monitoring information transmission channel with the session failure analyzer; sends monitoring data to the session failure analyzer based on the monitoring information transmission channel; receives an analysis result sent by the session failure analyzer based on the monitoring information transmission channel; and terminates the monitoring information transmission channel in response to receiving the analysis result. According to this method, after determining that the session failure occurs, the first device establishes the monitoring information transmission channel with the session failure analyzer as needed. After receiving the failure analysis result sent by the session failure analyzer, the first device terminates the monitoring information transmission channel. This can save computing and storage resources of the first device and the session failure analyzer, and improve running efficiency of the first device and the session failure analyzer.

In a possible implementation, the failure includes that session termination occurs once and/or that a quantity of times of session termination exceeds a specified threshold within a specified time period.

In a possible implementation, the session is a routing protocol session or a label distribution protocol session. Further, the routing protocol session is a border gateway protocol BGP session or an internal gateway protocol IGP session; and the label distribution protocol session is a label distribution protocol LDP session, a resource reservation protocol RSVP session, and/or a path computation element communication protocol PCEP session.

In a possible implementation, both the first device and the second device are routing devices.

According to a second aspect, an embodiment of the present disclosure provides a first system. The first system includes: a session failure determining module, configured to determine that a failure occurs in a session between the first system and a second system; a session establishment packet sending module, configured to send, to the second system after the failure occurs, a first session establishment packet used to establish a new session, where the first session establishment packet carries capability information of the first system, the capability information of the first system indicates that the first system does not have a capability of filtering a protocol packet for the new session, and the new session established between the first system and the second system does not have the capability of filtering the protocol packet. In this case, the first system and the second system do not have the capability of filtering the protocol packet for the newly established session, so as to ensure that after the new session is established, that the protocol packet, for example, a session keepalive packet, is filtered by the first system or the second system and that the session is terminated are avoided. This ensures availability of a network service.

In a possible implementation, the first system further includes: a session establishment packet receiving module, configured to: receive, after the failure occurs, a second session establishment packet that is sent by the second system and that is used to establish the new session, where the second session establishment packet carries capability information of the second system, and the capability information of the second system indicates that the second system does not have the capability of filtering the protocol packet for the new session; and establish the new session based on the first session establishment packet and the second session establishment packet, where the new session does not have the capability of filtering the protocol packet. In this case, the first system and the second system do not have the capability of filtering the protocol packet for the newly established session, so as to ensure that after the new session is established, that the protocol packet, for example, the session keepalive packet, is filtered by the first system or the second system and that the session is terminated are avoided. This ensures the availability of the network service.

In a possible implementation, the first system further includes: a failure analysis module, configured to: before the session establishment packet sending module sends the session establishment packet to the second system, perform failure analysis on the failure and obtain failure analysis result information; and the first system determines a failure cause based on the failure analysis result information. After the first system determines the session failure, if the first system supports a local failure analysis function based on the failure analysis module or performs failure analysis in cooperation with a session failure analyzer, the first system first performs failure analysis on the session failure. If the session failure is located, the first system obtains failure cause information, and the first system can recover the failure based on the failure cause, so that the network service returns to normal. If the session failure is not located, the first system does not obtain the failure cause information, the first system unsuccessfully determines the failure cause, and the first system cannot recover the failure.

In a possible implementation, the first system further includes: a monitoring channel establishing module, configured to establish a monitoring information transmission channel with the session failure analyzer; a monitoring information sending module, configured to send monitoring data to the session failure analyzer based on the monitoring information transmission channel; an analysis information receiving module, configured to receive, based on the monitoring information transmission channel, an analysis result sent by the session failure analyzer; and a monitoring channel terminating module, configured to terminate the monitoring information transmission channel in response to receiving the analysis result. According to this method, after determining that the session failure occurs, the first system establishes the monitoring information transmission channel with the session failure analyzer as needed. After receiving the failure analysis result sent by the session failure analyzer, the first system terminates the monitoring information transmission channel. This can save computing and storage resources of the first system and the session failure analyzer, and improve running efficiency of the first system and the session failure analyzer.

In a possible implementation, the failure includes that session termination occurs once and/or that a quantity of times of session termination exceeds a specified threshold within a specified time period.

In a possible implementation, the session is a routing protocol session or a label distribution protocol session. Further, the routing protocol session is a border gateway protocol BGP session or an internal gateway protocol IGP session; and the label distribution protocol session is a label distribution protocol LDP, a resource reservation protocol RSVP, and/or a path computation element communication protocol PCEP.

A computer-readable storage medium is further provided. The storage medium stores at least one instruction, and the instruction is loaded and executed by a processor to implement any one of the foregoing methods related to session protection.

A computer program product is provided. The computer program product includes computer program code. When the computer program code is run on a computer, the computer is enabled to perform the methods in the foregoing aspects.

DESCRIPTION OF EMBODIMENTS

To make the objectives, technical solutions, and advantages of the present disclosure clearer, the following further describes the present disclosure in detail with reference to the accompanying drawings. It is clear that the described embodiments are merely some rather than all of embodiments of the present disclosure.

Network architectures and service scenarios described in embodiments of the present disclosure are used as examples to describe the technical solutions of the present disclosure, but this does not mean that the present disclosure is applicable only to the following embodiments. A person of ordinary skill in the art may learn that, with evolution of a network architecture and emergence of a new service scenario, the technical solutions provided in the present disclosure are also applicable to resolving similar technical problems.

Figure 1:
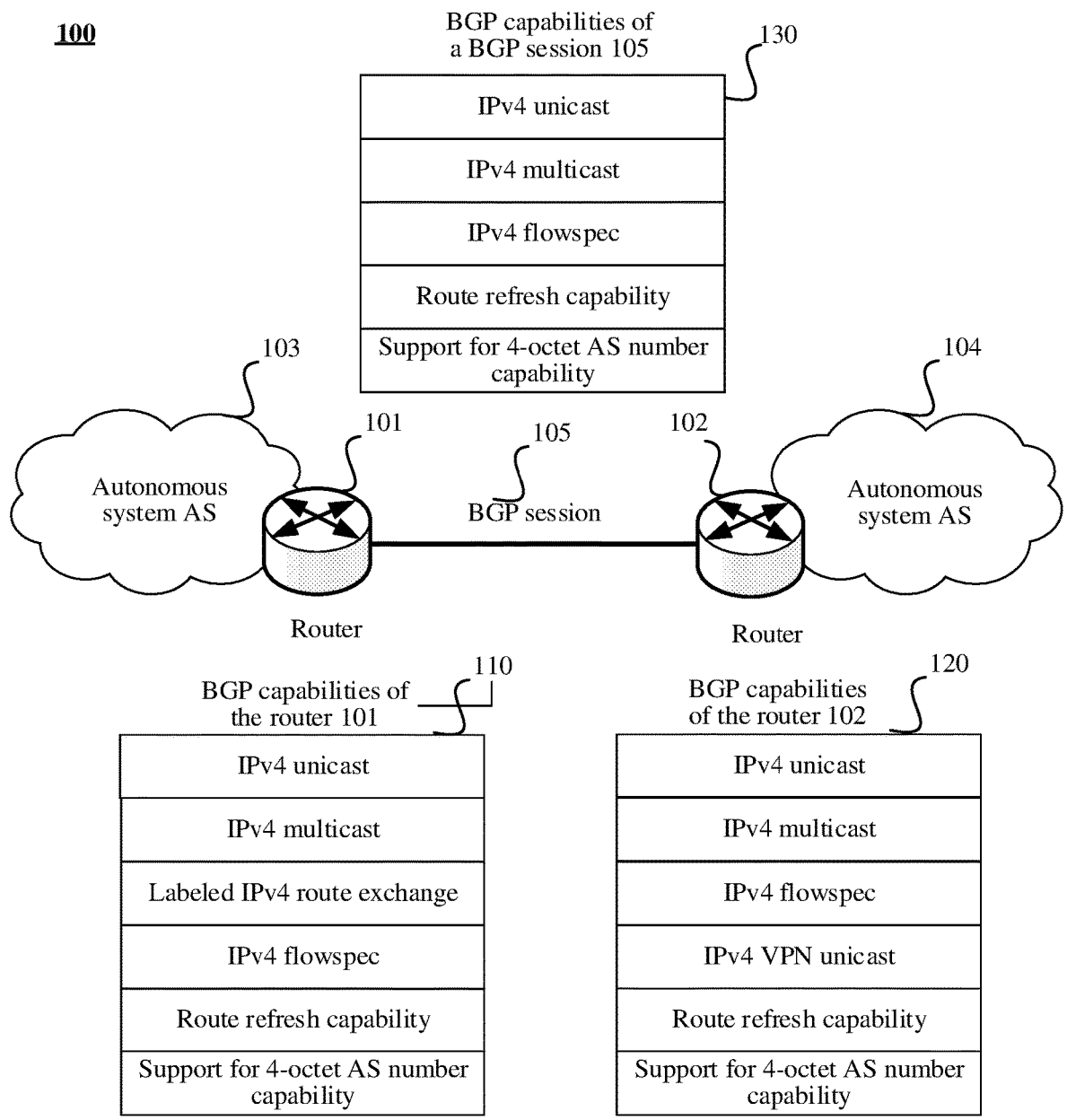
FIG. 1 is a schematic diagram of a scenario according to an embodiment of the present disclosure.

FIG. 1 is a schematic diagram of a scenario according to an embodiment of the present disclosure. The scenario described in a schematic diagram 100 is that a border router 101 of an autonomous system (AS) 103 and a border router 102 of an autonomous system AS 104 establish a border gateway protocol (BGP) session 105. The BGP is a dynamic routing protocol used between autonomous systems ASs, and is used to exchange reachable routing information between ASs and construct an inter-AS data transmission path. When the AS 103 and the AS 104 belong to a same AS, the BGP session 105 is an internal border gateway protocol (IBGP) session; or when the AS 103 and the AS 104 are two different ASs, the BGP session 105 is an external border gateway protocol (EBGP) session. There are four types of BGP packets: (1) a BGP open packet, used to establish a session between BGP peers; (2) a BGP keepalive packet, used to periodically send a keepalive message to a BGP peer to maintain validity of a session; (3) a BGP update packet, used to exchange routing information between BGP peers; (4) a BGP notification packet, used to notify a BGP exception; and (5) a BGP route-refresh packet, used to request a BGP peer to resend routing information of a specified address family. The BGP protocol has a periodic mechanism to ensure connection reliability, and has a plurality of capabilities and attributes, for example, a multiprotocol extension for BGP-4, a route refresh capability for BGP-4, and an outbound route filtering capability. The multiprotocol extension capability for BGP-4 may alternatively be based on an address family identifier (AFI) and a subsequent address family (SAFI), for example, the multiprotocol extension capabilities such as IPv4 unicast, IPv4 multicast, IPv4 flowspec, IPv6 unicast, and IPv6 flowspec. For a network device that supports the BGP, some BGP capabilities are enabled based on a network requirement. According to features of the BGP, one BGP session may support the following at the same time: (1) a plurality of BGP capabilities, (2) the BGP multiprotocol extension capability may further support a plurality of address families, and (3) when a BGP update message is received, the message may carry a plurality of different types of BGP path attributes. When the BPG capability and/or the BGP attribute is incorrectly configured and/or incorrectly processed by a device, an established BGP session is interrupted. When the BGP session is re-established, if the BGP capability and/or the BGP attribute carried on the BGP session is not adjusted or a device failure is not recovered, the established BGP session is interrupted again, causing the failure to occur repeatedly, and finally a service is terminated due to network flapping. As shown in FIG. 1, before the router 101 and the router 102 establish the BGP session 105, the router 101 sends a BGP open packet to the router 102, where the BGP open packet carries a BGP capability 110 of the router 101. The BGP capabilities 110 include: an IPv4 unicast, an IPv4 multicast, an IPv4-labeled route exchange (IPv4 labeled Unicast), an IPv4 flowspec, a route refresh capability, and a support for 4-octet AS number capability. The router 102 sends a BGP open packet to the router 101, where the BGP open packet carries a BGP capability 120 of the router 102. The BGP capabilities 120 include: an IPv4 unicast, an IPv4 multicast, an IPv4 flowspec, an IPv4 VPN unicast, a route refresh capability, and a support for 4-octet AS number capability. According to a current processing rule of the BGP, after an R1 and an R2 successfully establish the BGP session 105, the BGP capability supported by the BGP session 105 is an intersection of "the BGP capability 110 sent by the R1 to the R2" and "the BGP capability 120 sent by the R2 to the R1", and BGP capabilities 130 supported by the BGP session 105 include: an IPv4 unicast, an IPv4 multicast, an IPv4 flowspec, a route refresh capability, and a support for 4-octet AS number capability. According to the foregoing BGP session capability generation rule, when a router does not want to support one or more capabilities on an established BGP session, the one or more capabilities may be excluded from a BGP open packet in a BGP session establishment stage. For example, if the router 101 does not want to support the IPv4 flowspec capability on the BGP session established between the router 101 and the router 102, the IPv4 flowspec capability may be deleted or disabled from a BGP session startup configuration of the router 101, without depending on a configuration of the router 102.

Figure 2:
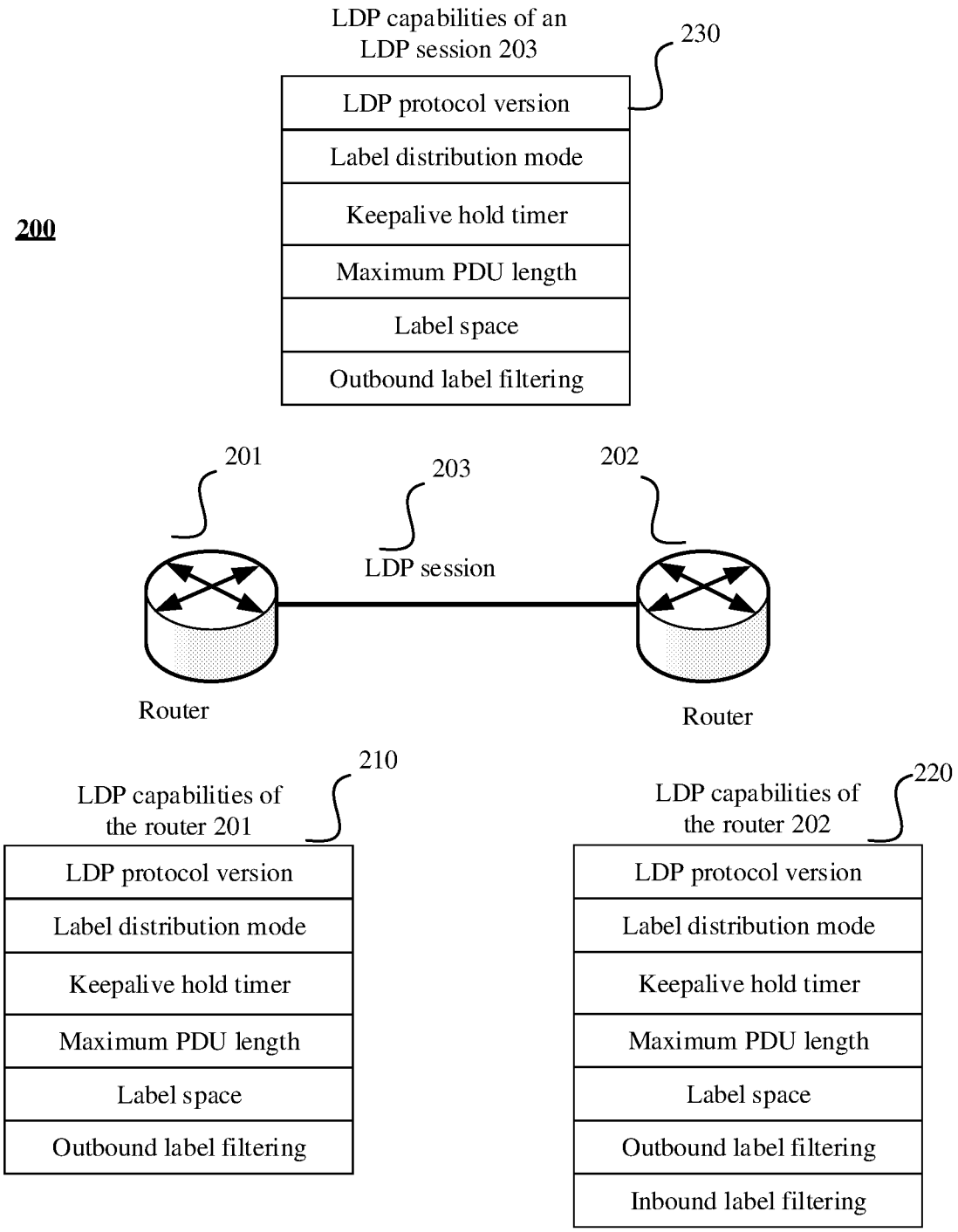
FIG. 2 is a schematic diagram of a scenario according to an embodiment of the present disclosure.

FIG. 2 is a schematic diagram of a scenario according to an embodiment. A schematic diagram 200 describes a label distribution network, where a router 201 and a router 202 support a label distribution protocol (LDP). The LDP is an application protocol used to obtain a label switched path (LSP) based on one or more label switch routing devices (LSR). A working mechanism of the LDP needs to establish an LDP session between two LSRs, for example, the router 201 and the router 202 shown in FIG. 2. There are four types of LDP protocol messages: (1) a discovery message, such as an LDP hello packet, used to advertise and maintain an LSR in a network; (2) a session message, used to establish, maintain, and terminate a session between the LSRs, for example, an initialization packet for negotiating a session parameter and a keepalive packet for maintaining the session; (3) an advertisement message, used to create, change, and delete a label relationship; and (4) a notification message, used to provide notification suggestion information, for example, a notification packet. Before an LDP session is established, two LSRs carry capabilities and parameters by using an LDP initialization packet by using a type length value (TLV), the two LSRs negotiate the capabilities and parameters by using the LDP initialization packet. If the negotiation is successful, the two LSRs enter a session establishment process. As shown in FIG. 2, the router 201 sends the LDP initialization packet to the router 202, where the LDP initialization packet includes the LDP capabilities and parameters 210 of the router 201. The LDP capabilities and parameters of the router 201 include: an LDP protocol version, a label distribution mode, a value of a hold timer, a maximum protocol data unit (PDU) length, a label space, and outbound label filtering (OLF). The router 202 receives the LDP initialization packet, checks correctness, and sends the LDP initialization packet to the router 201. The LDP initialization packet includes an LDP capability 220 of the router 202. The LDP capabilities and parameters of the router 202 include: an LDP protocol version, a label distribution mode, a value of a hold timer, a maximum PDU length, a label space, outbound label filtering (OLF), and inbound label filtering (ILF). The router 201 and the router 202 establish an LDP session 203. A capability 230 of the LDP session 203 is an intersection of the LDP capability 210 of the router 201 and the LDP capability 220 of the router 202, and includes: an LDP protocol version, a label distribution mode, a value of a hold timer, a maximum PDU length, a label space, and outbound label filtering (OLF). When an LSR does not want to support one or more capabilities on an established LDP session, the one or more capabilities may be excluded from the LDP initialization packet in an LDP session establishment stage. For example, if the router 201 does not want to support the ILF capability on the LDP session established between the router 201 and the router 202, the ILF capability may be deleted or disabled from an LDP session startup configuration of the router 201, without depending on a configuration of the router 202.

Figure 3:
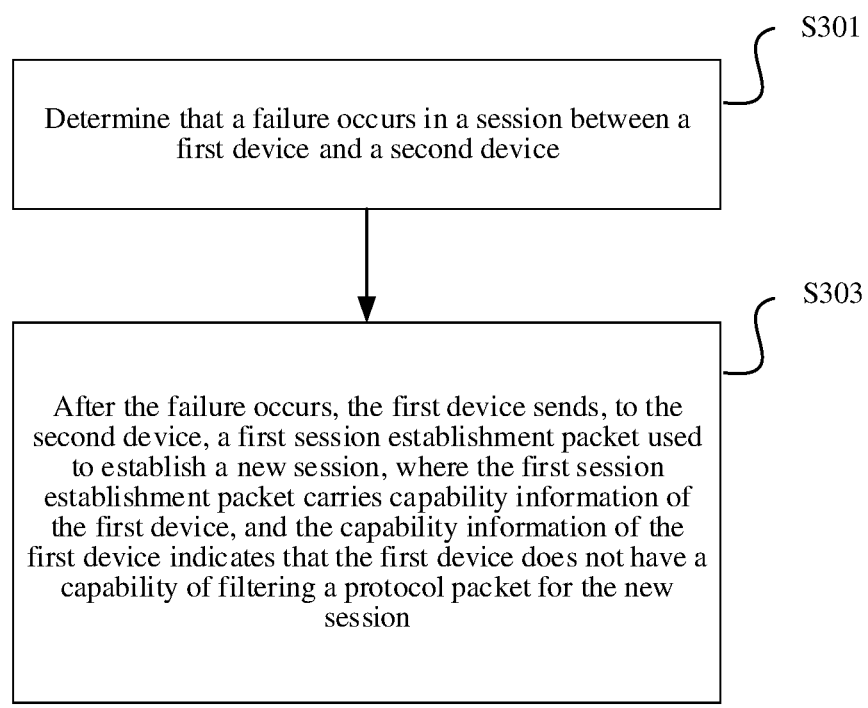
FIG. 3 is a flowchart of a manner according to an embodiment of the present disclosure.

FIG. 3 is a flowchart according to an embodiment of the present disclosure. This embodiment provides a method for session protection, in which after a session failure is found, a session supporting a basic capability is established, so as to ensure normal running of a basic service. A specific method is as follows:

S301: Determine that a failure occurs in a session between a first device and a second device.

In some embodiments, both the first device and the second device are routing devices. A BGP session has been established between the first device and the second device. Because a BPG capability in the BGP session is incorrectly configured, the established BGP session is terminated in this case. When the first device and the second device re-establish a BGP session, because the BGP capability carried on the BGP session is not adjusted or modified, the re-established BGP session is abnormally terminated again due to the foregoing reason. If a network administrator does not perform manual intervention, the foregoing failure occurs repeatedly. Consequently, network link flapping is caused, BGP route control information cannot be transmitted based on the BGP session, and a network service cannot be normally transmitted. For example, the first device, for example, the router 101 shown in FIG. 1, and the second device, for example, the router 102 shown in FIG. 1, establish a BGP session, for example, the BGP session 105 shown in FIG. 1. The first device and the second device negotiate a BGP capability, including an IPv4 flowspec capability, supported by both parties. A network in which the first device and the second device are located needs to forward some data packets via a BGP flowspec route. In this case, the first device defines a data packet forwarding policy and implements the policy by enabling the BGP flowspec route. A BGP flowspec route capability of the first device is incorrectly configured, for example, a quintuple of a data packet defined in the BGP flowspec policy is incorrectly configured. In this case, a BGP keepalive protocol packet between the first device and the second device matches the BGP flowspec policy, and is forwarded by the first device to another routing device, but is not sent to the second device. In this case, according to a BGP mechanism, the second device does not receive the BGP keepalive protocol packet within a specified time period, so that the BGP session is terminated. The first device discovers that the previously established BGP session is terminated and starts establishment of a BGP session with the second device. When the first device and the second device re-establish the BGP session, a BGP flowspec capability carried on the re-established BGP session is not adjusted or modified. As a result, the re-established BGP session is terminated abnormally again due to the foregoing reason. If the network administrator does not perform manual intervention, the foregoing failure occurs repeatedly. Consequently, the network link flapping is caused, the BGP route control information cannot be transmitted based on the BGP session, and the network service cannot be normally transmitted. In some embodiments, the BGP session failure includes: (1) Abnormal session termination occurs once; and (2) A quantity of times of session termination exceeds a threshold within a specified time period. A manner of determining that a session failure occurs is classified based on a subject that determines the failure, and includes automatic determining and manual determining. The automatic determining means that a routing device that supports the BGP automatically determines that a session failure occurs upon a quantity of BGP session failures satisfies a rule for failure reporting according to a session failure reporting rule. The manual determining means that the network administrator manually determines whether a failure occurs in a BGP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, in a session of a BGP route protocol and a session of an IGP route protocol, capabilities and parameters of two devices that establish a session are negotiated in a session establishment process, and session re-establishment is further supported after the session is terminated. In this case, the foregoing failure may occur in the session of the BGP route protocol and the session of the IGP route protocol. Consequently, the network link flapping is caused, the BGP route control information cannot be transmitted based on the BGP session, and the network service cannot be normally transmitted.

In some embodiments, both the first device, for example, the router 201 shown in FIG. 2, and the second device, for example, the router 202 shown in FIG. 2, support an LDP, and an LDP session is established between the first device and the second device. The established LDP session is terminated because an LDP capability is incorrectly configured. When the first device and the second device re-establish an LDP session, the LDP capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to the network flapping. For example, the LDP session is established between the first device and the second device, and capabilities, including an outbound label filtering (OLF) capability, supported by both the first device and the second device are negotiated. In this case, the first device defines an OLF policy. Because an LDP OLF capability of the first device is incorrectly configured, an LDP keepalive protocol packet between the first device and the second device is filtered out, and is not sent to the second device. In this case, the second device does not receive the LDP keepalive protocol packet within a specified time period, so that the LDP session is terminated. In this case, when the first device and the second device re-establish the LDP session, the LDP OLF capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to the network flapping.

In some embodiments, the LDP session failure includes: (1) Abnormal session termination occurs once; and (2) A quantity of times of session termination exceeds a threshold within a specified time period. A manner of determining that a session failure occurs is classified based on a subject that determines the failure, and includes automatic determining and manual determining. The automatic determining means that a label switching routing device that supports the LDP automatically determines that a session failure occurs upon a quantity of LDP session failures satisfies a rule for failure reporting according to a session failure reporting rule. The manual determining means that the network administrator manually determines whether a failure occurs in an LDP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, for a label distribution protocol session, capabilities and parameters of two devices that establish the session are negotiated in a process of establishing the session, and session re-establishment is further supported after the session is terminated. A label distribution protocol includes the LDP protocol, a resource reservation protocol (RSVP), and a path computation element communication protocol (PCEP). In this case, the foregoing failure may occur in the label distribution protocol session. Consequently, the network link flapping is caused, LDP label distribution information cannot be transmitted based on the LDP session, and the network service cannot be normally transmitted.

S303: After the failure occurs, the first device sends, to the second device, a first session establishment packet used to establish a new session, where the first session establishment packet carries capability information of the first device, and the capability information of the first device indicates that the first device does not have a capability of filtering a protocol packet for the new session.

In some embodiments, it is determined, by performing operation 301, that the failure occurs in the BGP session between the first device and the second device. The first device sends the first session establishment packet to the second device. The first session establishment packet, for example, a BGP open packet, is used to establish a new BGP session. The first session establishment packet carries the capability information of the first device. The capability information of the first device indicates that the first device does not have the capability of filtering the protocol packet for the new session. For example, the capabilities of the first device carried in the first session establishment packet include: an IPv4 unicast, an IPv4 multicast, an IPv4 flowspec, an IPv6 unicast, an IPv6 flowspec, and a route refresh capability. For example, when the failure occurs in the BGP session between the router 101 and the router 102, the router 101 sends the first session establishment packet to the router 102, where the BGP capabilities of the first session establishment packet include: the IPv4 unicast and the route refresh capability. In this case, the router 101 has the IPv4 unicast and the route refresh capability for the newly established BGP session, and does not have the capability of filtering the protocol packet, for example, the BGP flowspec capability.

In some embodiments, it is determined, by performing operation 301, that the failure occurs in the LDP session between the first device and the second device. The first device sends the first session establishment packet to the second device. The first session establishment packet, for example, an LDP initialization packet, is used to establish an LDP session. The first session establishment packet carries the capability information of the first device. The capability information of the first device indicates that the first device does not have the capability of filtering the protocol packet for the new session. For example, capabilities for supporting an LDP label switching routing device include: an LDP protocol version, a label distribution mode, a value of a keepalive hold timer, a maximum PDU length, a label space, an outbound label filtering (OLF) capability, and an inbound label filtering (ILF) capability. For example, when the failure occurs in the LDP session between the router 201 and the router 202, the router 201 sends the first session establishment packet to the router 202, where LDP capabilities of the first session establishment packet include: the LDP version, the label distribution mode, the value of the keepalive hold timer, the maximum PDU length, and the label space. In this case, the router 201 has the capabilities of the LDP version, the label distribution mode, the value of the keepalive hold timer, the maximum PDU length, and the label space for the newly established LDP session, and does not have the capability of filtering the protocol packet, for example, the outbound label filtering (OLF) capability and the inbound label filtering (ILF) capability.

Figure 4:
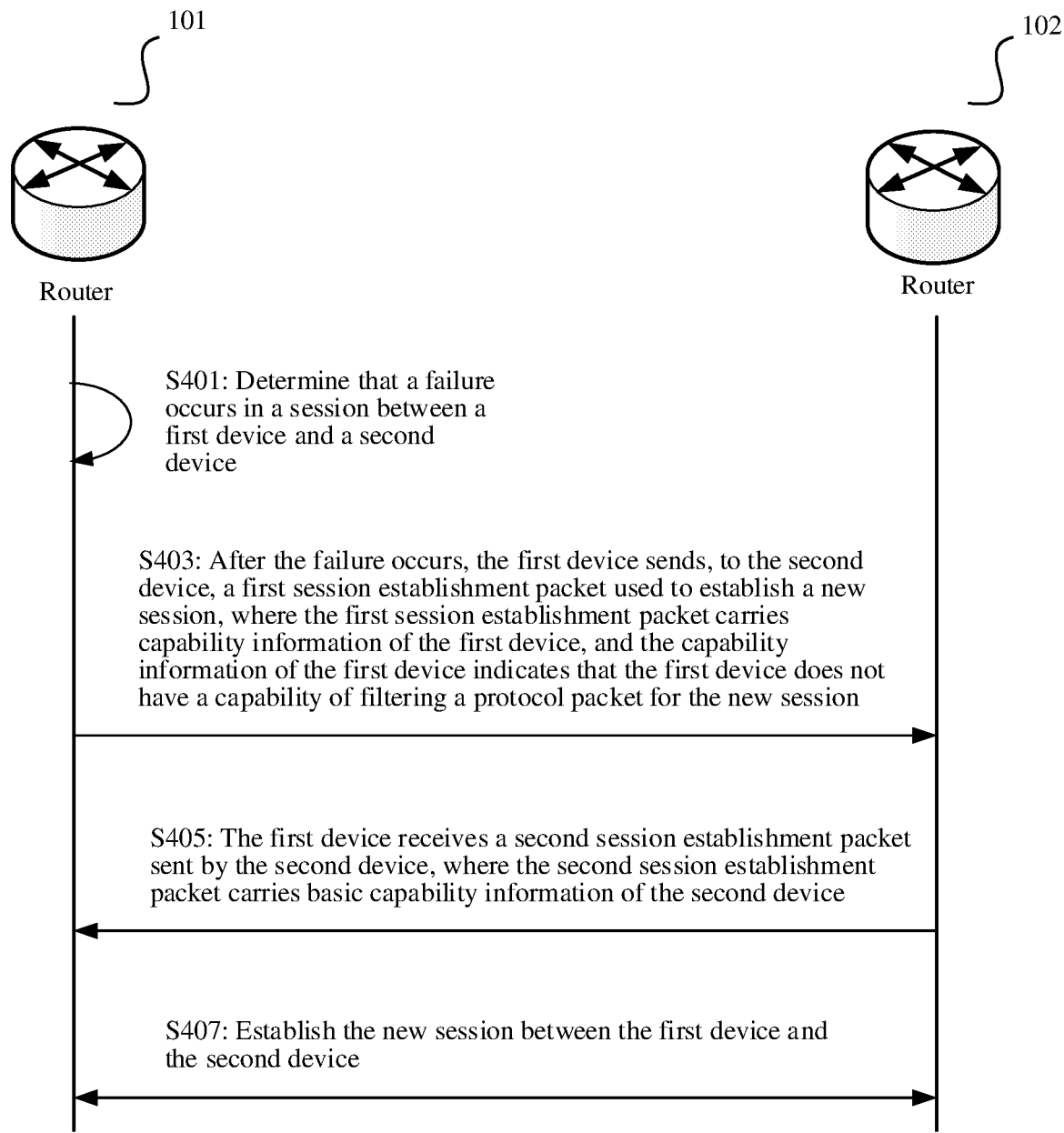
FIG. 4 is a flowchart of a method according to an embodiment of the present disclosure.

FIG. 4 is a flowchart according to an embodiment of the present disclosure. This embodiment provides a method for session protection. A specific method is as follows:

S401: Determine that a failure occurs in a session between a first device and a second device.

In some embodiments, both the first device and the second device are routing devices. A BGP session has been established between the first device and the second device. Because a BPG capability in the BGP session is incorrectly configured, the established BGP session is terminated in this case. When the first device and the second device re-establish a BGP session, because the BGP capability carried on the BGP session is not adjusted or modified, the re-established BGP session is abnormally terminated again due to the foregoing reason. If a network administrator does not perform manual intervention, the foregoing failure occurs repeatedly. Consequently, network link flapping is caused, BGP route control information cannot be transmitted based on the BGP session, and a network service cannot be normally transmitted. For example, the first device, for example, the router 101 shown in FIG. 1, and the second device, for example, the router 102 shown in FIG. 1, establish a BGP session, for example, the BGP session 105 shown in FIG. 1. The first device and the second device negotiate a BGP capability, including an IPv4 flowspec capability, supported by both parties. A network in which the first device and the second device are located needs to forward some data packets via a BGP flowspec route. In this case, the first device defines a data packet forwarding policy and implements the policy by enabling the BGP flowspec route. A BGP flowspec route capability of the first device is incorrectly configured, for example, a quintuple of a data packet defined in the BGP flowspec policy is incorrectly configured. In this case, a BGP keepalive protocol packet between the first device and the second device matches the BGP flowspec policy, and is forwarded by the first device to another routing device, but is not sent to the second device. In this case, according to a BGP mechanism, the second device does not receive the BGP keepalive protocol packet within a specified time period, so that the BGP session is terminated. The first device discovers that the previously established BGP session is terminated and starts establishment of the BGP session with the second device. When the first device and the second device re-establish the BGP session, a BGP flowspec capability carried on the re-established BGP session is not adjusted or modified. As a result, the re-established BGP session is terminated abnormally again due to the foregoing reason. If the network administrator does not perform manual intervention, the foregoing failure occurs repeatedly. Consequently, the network link flapping is caused, the BGP route control information cannot be transmitted based on the BGP session, and the network service cannot be normally transmitted. In some embodiments, the BGP session failure includes: (1) Abnormal session termination occurs once; and (2) A quantity of times of session termination exceeds a threshold within a specified time period. A manner of determining that a session failure occurs is classified based on a subject that determines the failure, and includes automatic determining and manual determining. The automatic determining means that a routing device that supports the BGP automatically determines that a session failure occurs upon a quantity of BGP session failures satisfies a rule for failure reporting according to a session failure reporting rule. The manual determining means that the network administrator manually determines whether the failure occurs in the BGP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, in a session of a BGP route protocol and a session of an IGP route protocol, capabilities and parameters of two devices that establish a session are negotiated in a session establishment process, and session re-establishment is further supported after the session is terminated. In this case, the foregoing failure may occur in the session of the BGP route protocol and the session of the IGP route protocol. Consequently, the network link flapping is caused, the BGP route control information cannot be transmitted based on the BGP session, and the network service cannot be normally transmitted.

In some embodiments, both the first device, for example, the router 201 shown in FIG. 2, and the second device, for example, the router 202 shown in FIG. 2, support an LDP, and an LDP session is established between the first device and the second device. The established LDP session is terminated because an LDP capability is incorrectly configured. When the first device and the second device re-establish an LDP session, the LDP capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to network flapping. For example, the LDP session is established between the first device and the second device, and capabilities, including an outbound label filtering (OLF) capability, supported by both the first device and the second device are negotiated. In this case, the first device defines an OLF policy. Because an LDP OLF capability of the first device is incorrectly configured, an LDP keepalive protocol packet between the first device and the second device is filtered out, and is not sent to the second device. In this case, the second device does not receive the LDP keepalive protocol packet within a specified time period, so that the LDP session is terminated. In this case, when the first device and the second device re-establish the LDP session, the LDP OLF capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to the network flapping.

In some embodiments, the LDP session failure includes: (1) Abnormal session termination occurs once; and (2) A quantity of times of session termination exceeds a threshold within a specified time period. A manner of determining that a session failure occurs is classified based on a subject that determines the failure, and includes automatic determining and manual determining. The automatic determining means that a label switching routing device that supports the LDP automatically determines that a session failure occurs upon a quantity of LDP session failures satisfies a rule for failure reporting according to a session failure reporting rule. The manual determining means that the network administrator manually determines whether the failure occurs in the LDP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, for a label distribution protocol session, capabilities and parameters of two devices that establish the session are negotiated in a process of establishing the session, and session re-establishment is further supported after the session is terminated. A label distribution protocol includes the LDP protocol, a resource reservation protocol (RSVP), and a path computation element communication protocol (PCEP). In this case, the foregoing failure may occur in the label distribution protocol session. Consequently, the network link flapping is caused, LDP label distribution information cannot be transmitted based on the LDP session, and the network service cannot be normally transmitted.

S403: After the failure occurs, the first device sends, to the second device, a first session establishment packet used to establish a new session, where the first session establishment packet carries capability information of the first device, and the capability information of the first device indicates that the first device does not have a capability of filtering a protocol packet for the new session.

In some embodiments, it is determined, by performing operation 401, that the failure occurs in the BGP session between the first device and the second device. The first device sends the first session establishment packet to the second device. The first session establishment packet, for example, a BGP open packet, is used to establish a new BGP session. The first session establishment packet carries the capability information of the first device. The capability information of the first device indicates that the first device does not have the capability of filtering the protocol packet for the new session. For example, the capabilities of the first device carried in the first session establishment packet include: an IPv4 unicast, an Ipv4 multicast, an Ipv4 flowspec, an Ipv6 unicast, an Ipv6 flowspec, and a route refresh capability. For example, when the failure occurs in the BGP session between the router 101 and the router 102, the router 101 sends the first session establishment packet to the router 102, where the BGP capabilities of the first session establishment packet include: the Ipv4 unicast and the route refresh capability. In this case, the router 101 has the Ipv4 unicast and the route refresh capability for the newly established BGP session, and does not have the capability of filtering the protocol packet, for example, a BGP flowspec capability.

In some embodiments, it is determined, by performing operation 401, that the failure occurs in the LDP session between the first device and the second device. The first device sends the first session establishment packet to the second device. The first session establishment packet, for example, an LDP initialization packet, is used to establish the LDP session. The first session establishment packet carries the capability information of the first device. The capability information of the first device indicates that the first device does not have the capability of filtering the protocol packet for the new session. For example, capabilities for supporting an LDP label switching routing device include: an LDP protocol version, a label distribution mode, a value of a keepalive hold timer, a maximum PDU length, a label space, an outbound label filtering (OLF) capability, and an inbound label filtering (ILF) capability. For example, when the failure occurs in the LDP session between the router 201 and the router 202, the router 201 sends the first session establishment packet to the router 202, where LDP capabilities of the first session establishment packet include: the LDP version, the label distribution mode, the value of the keepalive hold timer, the maximum PDU length, and the label space. In this case, the router 201 has the capabilities of the LDP version, the label distribution mode, the value of the keepalive hold timer, the maximum PDU length, and the label space for the newly established LDP session, and does not have the capability of filtering the protocol packet, for example, the outbound label filtering (OLF) capability and the inbound label filtering (ILF) capability.

S405: The first device receives a second session establishment packet that is sent by the second device and that is used to establish the new session, where the second session establishment packet carries capability information of the second device, and the capability information of the second device indicates that the second device does not have the capability of filtering the protocol packet for the new session.

In some embodiments, after receiving the first session establishment packet sent by the first device in operation S403, the second device sends, to the first device, the second session establishment packet used to establish the new session. In this case, the first device receives the second session establishment packet that is sent by the second device and that is used to establish the new session. The second session establishment packet, for example, a BGP open packet, is a packet used to establish the new session. The second session establishment packet carries the capability information of the second device. The first device receives the second session establishment packet sent by the second device, where the second session establishment packet carries the capability information of the second device, and the capability information of the second device indicates that the second device does not have the capability of filtering the protocol packet for the new session. For example, capabilities of the second device for the BGP session include: an IPv4 unicast, an IPv4 multicast, an IPv4 flowspec, an IPv6 unicast, an IPv6 flowspec, and a route refresh capability. For example, when the failure occurs in the BGP session between the router 101 and the router 102, the router 101 sends the first session establishment packet to the router 102; after receiving the first session establishment packet, the router 102 sends the second session establishment packet to the router 101, where BGP capabilities of the router 102 carried in the second session establishment packet include: the IPv4 unicast and the route refresh capability. In this case, the router 102 has the IPv4 unicast and the route refresh capability for the newly established BGP session, and does not have the capability of filtering the protocol packet, for example, the BGP flowspec capability.

In some embodiments, after receiving the first session establishment packet sent by the first device in operation S403, the second device sends, to the first device, the second session establishment packet used to establish the new session. The second session establishment packet, for example, an LDP initialization packet, is used to establish the new session. The second session establishment packet carries the capability information of the second device. The first device receives the second session establishment packet sent by the second device, where the second session establishment packet carries the capability information of the second device, and the capability information of the second device indicates that the second device does not have the capability of filtering the protocol packet for the new session. For example, capabilities of the second device for the LDP session include: an LDP version, a label distribution mode, a value of a keepalive hold timer, a maximum PDU length, a label space, an outbound label filtering (OLF) capability, and an inbound label filtering (ILF) capability. For example, when the failure occurs in the LDP session between the router 101 and the router 102, the router 101 sends the first session establishment packet to the router 102; and the router 102 sends the second session establishment packet to the router 101, where LDP capabilities of the router 102 carried in the second session establishment packet include: the LDP version, the label distribution mode, the value of the keepalive hold timer, the maximum PDU length, and the label space. In this case, the router 102 has capabilities of the LDP version, the label distribution mode, the value of the keepalive hold timer, the maximum PDU length, and the label space for the newly established LDP session, and does not have the capability of filtering the protocol packet, for example, the LDP OLF or the LDP ILF capability.

S407: Establish the new session between the first device and the second device.

In some embodiments, the first device and the second device perform operation S405, and the first device and the second device establish the new session. For example, after receiving the second session establishment packet sent by the router 102, the router 101 checks correctness of the packet and negotiates a BGP capability. Through the foregoing operations, the router 101 and the router 102 have the same BGP capabilities for the new session, both have the IPv4 unicast and the route refresh capability, and do not have the capability of filtering the protocol packet.

In some embodiments, the first device and the second device perform operation S405, and the first device and the second device establish the new session. For example, after receiving the second session establishment packet sent by the router 102, the router 101 checks correctness of the packet and negotiates an LDP capability. Through the foregoing operations, the router 101 and the router 102 have the same LDP capabilities for the new LDP session, and both have the LDP version, the label distribution mode, the value of the keepalive hold timer, the maximum PDU length, and the label space capability, and do not have the capability of filtering the protocol packet.

Figure 5:
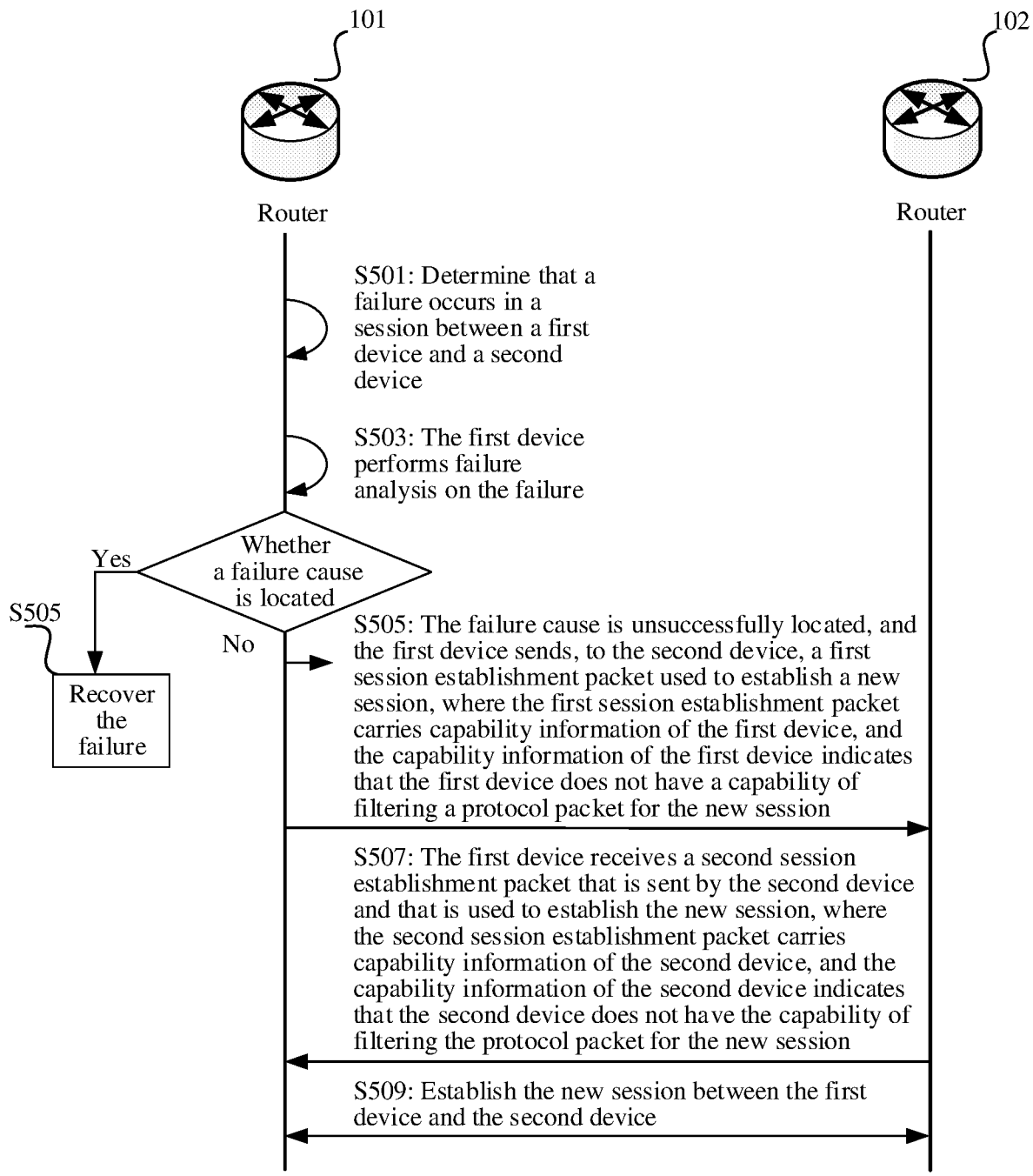
FIG. 5 is a flowchart of a method according to an embodiment of the present disclosure.

FIG. 5 is a flowchart according to an embodiment of the present disclosure. This embodiment provides a method for session protection. According to the method, after a session failure occurs, the session failure is to be analyzed and located. If a failure cause is successfully located, the failure is recovered based on the failure cause; or if the failure cause is not successfully located, a first device and a second device establish a new session, so as to ensure normal running of a network service. A specific method is as follows:

S501: Determine that a failure occurs in a session between a first device and a second device.

In some embodiments, both the first device and the second device are routing devices. A BGP session has been established between the first device and the second device. Because a BPG capability in the BGP session is incorrectly configured, the established BGP session is terminated in this case. When the first device and the second device re-establish the BGP session, because the BGP capability carried on the BGP session is not adjusted or modified, the re-established BGP session is abnormally terminated again due to the foregoing reason. If a network administrator does not perform manual intervention, the foregoing failure occurs repeatedly. Consequently, network link flapping is caused, BGP route control information cannot be transmitted based on the BGP session, and a network service cannot be normally transmitted. For example, the first device, for example, the router 101 shown in FIG. 1, and the second device, for example, the router 102 shown in FIG. 1, establish a BGP session, for example, the BGP session 105 shown in FIG. 1. The first device and the second device negotiate a BGP capability, including an IPv4 flowspec capability, supported by both parties. A network in which the first device and the second device are located needs to forward some data packets via a BGP flowspec route. In this case, the first device defines a data packet forwarding policy and implements the policy by enabling the BGP flowspec route. A BGP flowspec route capability of the first device is incorrectly configured, for example, a quintuple of a data packet defined in the BGP flowspec policy is incorrectly configured. In this case, a BGP keepalive protocol packet between the first device and the second device matches the BGP flowspec policy, and is forwarded by the first device to another routing device, but is not sent to the second device. In this case, according to a BGP mechanism, the second device does not receive the BGP keepalive protocol packet within a specified time period, so that the BGP session is terminated. The first device discovers that the previously established BGP session is terminated and starts establishment of the BGP session with the second device. When the first device and the second device re-establish the BGP session, a BGP flowspec capability carried on the re-established BGP session is not adjusted or modified. As a result, the re-established BGP session is terminated abnormally again due to the foregoing reason. If the network administrator does not perform manual intervention, the foregoing failure occurs repeatedly. Consequently, the network link flapping is caused, the BGP route control information cannot be transmitted based on the BGP session, and the network service cannot be normally transmitted. In some embodiments, the BGP session failure includes: (1) Abnormal session termination occurs once; and (2) A quantity of times of session termination exceeds a threshold within a specified time period. A manner of determining that a session failure occurs is classified based on a subject that determines the failure, and includes automatic determining and manual determining. The automatic determining means that a routing device that supports the BGP automatically determines that a session failure occurs upon a quantity of BGP session failures satisfies a rule for failure reporting according to a session failure reporting rule. The manual determining means that the network administrator manually determines whether the failure occurs in the BGP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, in a session of a BGP route protocol and a session of an IGP route protocol, capabilities and parameters of two devices that establish a session are negotiated in a session establishment process, and session re-establishment is further supported after the session is terminated. In this case, the foregoing failure may occur in the session of the BGP route protocol and the session of the IGP route protocol. Consequently, the network link flapping is caused, the BGP route control information cannot be transmitted based on the BGP session, and the network service cannot be normally transmitted.

In some embodiments, both the first device, for example, the router 201 shown in FIG. 2, and the second device, for example, the router 202 shown in FIG. 2, support an LDP, and an LDP session is established between the first device and the second device. The established LDP session is terminated because an LDP capability is incorrectly configured. When the first device and the second device re-establish the LDP session, the LDP capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to the network flapping. For example, the LDP session is established between the first device and the second device, and capabilities, including an outbound label filtering (OLF) capability, supported by both the first device and the second device are negotiated. In this case, the first device defines an OLF policy. Because an LDP OLF capability of the first device is incorrectly configured, an LDP keepalive protocol packet between the first device and the second device is filtered out, and is not sent to the second device. In this case, the second device does not receive the LDP keepalive protocol packet within a specified time period, so that the LDP session is terminated. In this case, when the first device and the second device re-establish the LDP session, the LDP OLF capability carried on the LDP session is not adjusted or modified. As a result, the re-established LDP session is terminated abnormally again due to the foregoing reason. If the network administrator does not perform manual intervention, the foregoing failure occurs repeatedly, and the service is interrupted due to the network flapping.

In some embodiments, the LDP session failure includes: (1) Abnormal session termination occurs once; and (2) A quantity of times of session termination exceeds a threshold within a specified time period. A manner of determining that a session failure occurs is classified based on a determining subject of the failure, including automatic determining and manual determining. The automatic determining means that a label switching routing device that supports the LDP automatically determines that a session failure occurs upon a quantity of LDP session failures satisfies a rule for failure reporting according to a session failure reporting rule. The manual determining means that the network administrator manually determines whether the failure occurs in the LDP session. For example, according to the session failure reporting rule, the routing device automatically determines that the failure occurs in the session if the session is terminated for more than three times within 60 minutes. The network administrator finds, by viewing a device log, that the session is terminated twice within 60 minutes, and the network administrator manually determines that the failure occurs in the session.

In some embodiments, for a label distribution protocol session, capabilities and parameters of two devices that establish the session are negotiated in a process of establishing the session, and session re-establishment is further supported after the session is terminated. A label distribution protocol includes the LDP, a resource reservation protocol (RSVP), and a path computation element communication protocol (PCEP). In this case, the foregoing failure may occur in the label distribution protocol session. Consequently, the network link flapping is caused, LDP label distribution information cannot be transmitted based on the LDP session, and the network service cannot be normally transmitted.

S503: The first device performs failure analysis on the failure.

In some embodiments, the first device supports a local failure analysis function. In this case, the first device monitors and collects session information, and performs, by using the failure analysis function, session failure analysis on the session failure determined by the first device. The first device obtains a failure analysis result. The failure analysis result includes: a failure locating result, a failure cause analysis, and/or a failure recovery suggestion. In some embodiments, the failure analysis result includes that a failure cause of a session failure 1 is not located. In some embodiments, the failure analysis result includes that a failure cause of a session failure 2 is located, and the failure cause is that a BGP keepalive packet is filtered out according to a routing policy.

In some embodiments, a session failure analyzer is deployed in the network, and the session failure analyzer performs failure locating and failure analysis on the session failure based on reported session information, and generates a failure analysis result. The failure analysis result includes: a failure locating result, a failure cause analysis, and/or a failure recovery suggestion. In some embodiments, failure analysis result information includes that a failure cause of a session failure 1 is not located. In some embodiments, the failure analysis result includes that a session failure cause of a session failure 2 is located, and the failure cause is that a BGP keepalive packet is filtered out according to a routing policy. The first device supports session information monitoring and collection, and reports session monitoring data to the session failure analyzer. When the first device determines the session failure, the first device establishes a monitoring information transmission channel with the session failure analyzer. For example, when the first device determines that the BGP session failure occurs, the first device enables a BGP monitoring protocol (BMP) to establish a BMP session with the session failure analyzer. The first device sends monitoring data to the session failure analyzer based on the monitoring information transmission channel. For example, the first device sends collected BGP monitoring data to the session failure analyzer based on the established BMP session. The first device receives, based on a monitoring information transmission notification, the analysis result sent by the session failure analyzer. For example, the first device receives, based on the established BMP session, the failure analysis result sent by the session failure analyzer. After receiving the analysis result sent by the session failure analyzer, the first device terminates the monitoring information transmission notification. For example, after receiving the failure analysis result, the first device terminates the BMP session.

In some embodiments, the session failure analyzer is deployed in the network, and the session failure analyzer performs failure locating and failure analysis on the session failure based on the monitoring data, and generates the failure analysis result. The first device supports session monitoring data collection and reporting of monitoring data collection data. When the first device determines that the session failure occurs, the first device establishes the monitoring information transmission channel with the session failure analyzer. For example, when the first device determines that the LDP session failure occurs, the first device establishes a transmission control protocol (TCP) connection to the session failure analyzer, where the TCP connection is used to establish an LDP monitoring channel between the first device and the session failure analyzer. The first device sends monitoring data to the session failure analyzer based on the monitoring information transmission channel. For example, the first device sends collected LDP monitoring data to the session failure analyzer based on the established LDP monitoring channel. The first device receives, based on a monitoring information transmission notification, the analysis result sent by the session failure analyzer. For example, the first device receives, based on established LDP monitoring communication, the failure analysis result sent by the session failure analyzer. After receiving the analysis result sent by the session failure analyzer, the first device terminates the monitoring information transmission notification. For example, after receiving the failure analysis result, the first device terminates the LDP monitoring channel.

S505: If the failure cause is located, the failure is recovered; or if the failure cause is not located, the first device sends, to the second device, a first session establishment packet used to establish a new session, where the first session establishment packet carries capability information of the first device, and the capability information of the first device indicates that the first device does not have a capability of filtering a protocol packet for the new session.

In some embodiments, the first device obtains the failure analysis result, and determines whether the failure cause is located. If the failure cause is successfully located, the first device recovers the failure based on failure locating information, so that the session failure is recovered and the network service is restored. If the failure cause is not located, the failure cause locating fails, and the session failure continues to exist.

In some embodiments, the first device sends the first session establishment packet to the second device. The first session establishment packet, for example, a BGP open packet, is used to establish a new BGP session. The first session establishment packet carries the capability information of the first device. The capability information of the first device indicates that the first device does not have the capability of filtering the protocol packet for the new session. For example, the capabilities of the first device carried in the first session establishment packet include: an IPv4 unicast, an Ipv4 multicast, an Ipv4 flowspec, an Ipv6 unicast, an Ipv6 flowspec, and a route refresh capability. For example, when the failure occurs in the BGP session between the router 101 and the router 102, the router 101 sends the first session establishment packet to the router 102, where the BGP capabilities of the first session establishment packet include: the Ipv4 unicast and the route refresh capability. In this case, the router 101 has the Ipv4 unicast and the route refresh capability for the newly established BGP session, and does not have the capability of filtering the protocol packet, for example, a BGP flowspec capability.

In some embodiments, the first device sends the first session establishment packet to the second device. The first session establishment packet, for example, an LDP initialization packet, is used to establish an LDP session. The first session establishment packet carries the capability information of the first device. The capability information of the first device indicates that the first device does not have the capability of filtering the protocol packet for the new session. For example, capabilities for supporting an LDP label switching routing device include: an LDP protocol version, a label distribution mode, a value of a keepalive hold timer, a maximum PDU length, a label space, an outbound label filtering (OLF) capability, and an inbound label filtering (ILF) capability. For example, when the failure occurs in the LDP session between the router 201 and the router 202, the router 201 sends the first session establishment packet to the router 202, where LDP capabilities of the first session establishment packet include: the LDP version, the label distribution mode, the value of the keepalive hold timer, the maximum PDU length, and the label space. In this case, the router 201 has the capabilities of the LDP version, the label distribution mode, the value of the keepalive hold timer, the maximum PDU length, and the label space for the newly established LDP session, and does not have the capability of filtering the protocol packet, for example, the outbound label filtering (OLF) capability and the inbound label filtering (ILF) capability.

S507: The first device receives a second session establishment packet that is sent by the second device and that is used to establish the new session, where the second session establishment packet carries capability information of the second device, and the capability information of the second device indicates that the second device does not have the capability of filtering the protocol packet for the new session.

In some embodiments, after receiving the first session establishment packet sent by the first device in operation S505, the second device sends, to the first device, the second session establishment packet used to establish the new session. In this case, the first device receives the second session establishment packet that is sent by the second device and that is used to establish the new session. The second session establishment packet, for example, a BGP open packet, is a packet used to establish the new session. The second session establishment packet carries the capability information of the second device. The first device receives the second session establishment packet sent by the second device, where the second session establishment packet carries the capability information of the second device, and the capability information of the second device indicates that the second device does not have the capability of filtering the protocol packet for the new session. For example, capabilities of the second device for the BGP session include: the IPv4 unicast, the IPv4 multicast, the IPv4 flowspec, the IPv6 unicast, the IPv6 flowspec, and the route refresh capability. For example, when the failure occurs in the BGP session between the router 101 and the router 102, the router 101 sends the first session establishment packet to the router 102; after receiving the first session establishment packet, the router 102 sends the second session establishment packet to the router 101, where BGP capabilities of the router 102 carried in the second session establishment packet include: the IPv4 unicast and the route refresh capability. In this case, the router 102 has the IPv4 unicast and the route refresh capability for the newly established BGP session, and does not have the capability of filtering the protocol packet, for example, the BGP flowspec capability.

In some embodiments, after receiving the first session establishment packet sent by the first device in operation S505, the second device sends, to the first device, the second session establishment packet used to establish the new session. The second session establishment packet, for example, an LDP initialization packet, is used to establish the new session. The second session establishment packet carries the capability information of the second device. The first device receives the second session establishment packet sent by the second device, where the second session establishment packet carries the capability information of the second device, and the capability information of the second device indicates that the second device does not have the capability of filtering the protocol packet for the new session. For example, capabilities of the second device for the LDP session include: the LDP version, the label distribution mode, the value of the keepalive hold timer, the maximum PDU length, the label space, the outbound label filtering (OLF) capability, and the inbound label filtering (ILF) capability. For example, when the failure occurs in the LDP session between the router 101 and the router 102, the router 101 sends the first session establishment packet to the router 102; and the router 102 sends the second session establishment packet to the router 101, where LDP capabilities of the router 102 carried in the second session establishment packet include: the LDP version, the label distribution mode, the value of the keepalive hold timer, the maximum PDU length, and the label space. In this case, the router 102 has capabilities of the LDP version, the label distribution mode, the value of the keepalive hold timer, the maximum PDU length, and the label space for the newly established LDP session, and does not have the capability of filtering the protocol packet, for example, the LDP OLF or the LDP ILF capability.

S509: Establish the new session between the first device and the second device.

In some embodiments, the first device and the second device perform operation S505, and the first device and the second device establish the new session. For example, after receiving the second session establishment packet sent by the router 102, the router 101 checks correctness of the packet and negotiates a BGP capability. Through the foregoing operations, the router 101 and the router 102 have the same BGP capabilities for the new session, both have the IPv4 unicast and the route refresh capability, and do not have the capability of filtering the protocol packet.

In some embodiments, the first device and the second device perform operation S505, and the first device and the second device establish the new session. For example, after receiving the second session establishment packet sent by the router 102, the router 101 checks correctness of the packet and negotiates an LDP capability. Through the foregoing operations, the router 101 and the router 102 have the same LDP capabilities for the new LDP session, and both have the LDP version, the label distribution mode, the value of the keepalive hold timer, the maximum PDU length, and the label space capability, and do not have the capability of filtering the protocol packet.

Figure 6:
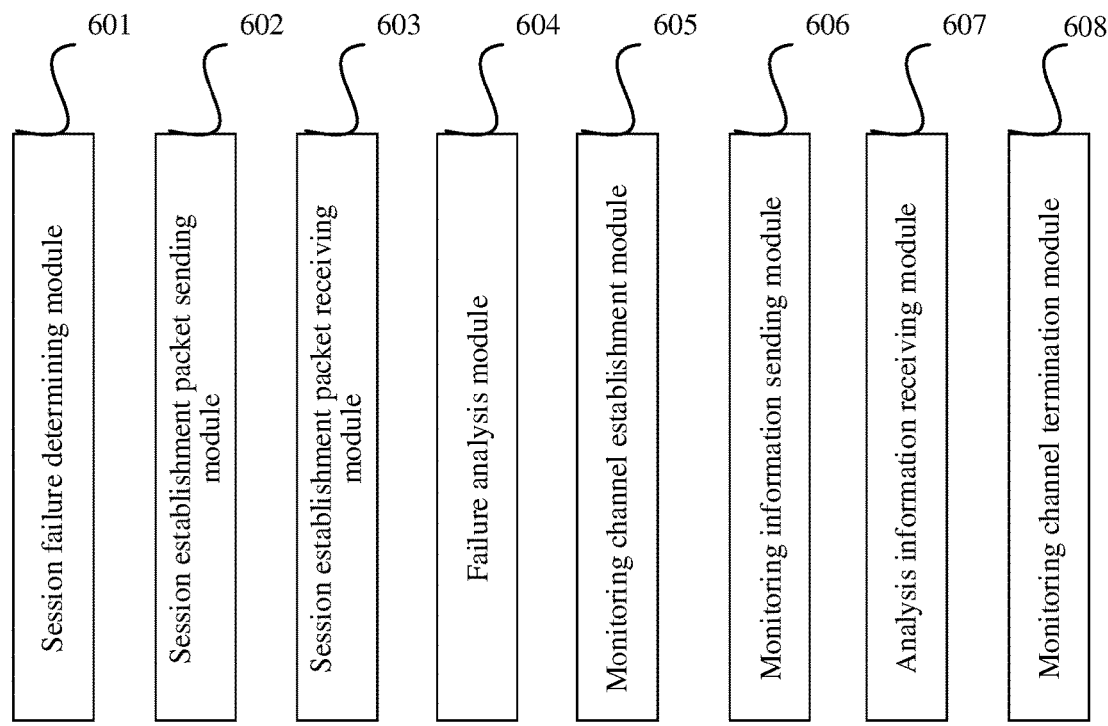
FIG. 6 is a schematic diagram of a first system according to an embodiment of the present disclosure.

An embodiment of the present disclosure further provides a first system. The first system is configured to perform, by using modules shown in FIG. 6, some or all operations performed by the router 101 in FIG. 3 to FIG. 5. Refer to FIG. 6, the first system 600 includes:

a session failure determining module 601, configured to determine that a failure occurs in a session between a first system and a second system, where for an operation performed by the session failure determining module 601, refer to S305 shown in FIG. 3, S401 shown in FIG. 4, and S501 shown in FIG. 5; and a session establishment packet sending module 602, configured to send, to the second system after the failure occurs, a first session establishment packet used to establish a new session, where the first session establishment packet carries capability information of the first system, and the capability information of the first system indicates that the first system does not have a capability of filtering a protocol packet for the new session, where for an operation performed by the session establishment packet sending module 602, refer to S303 shown in FIG. 3, S403 shown in FIG. 4, and S505 shown in FIG. 5. According to the foregoing system, after determining that the failure occurs in the session, the first system and the second system do not have the capability of filtering the protocol packet for the new session, so as to ensure normal running of a basic network service.

In some embodiments, the first system 600 may further include:

a session establishment packet receiving module 603, configured to: receive, after the failure occurs, a second session establishment packet that is sent by the second system and that is used to establish the new session, where the second session establishment packet carries capability information of the second system, and the capability information of the second system indicates that the second system does not have the capability of filtering the protocol packet for the new session, where for an operation performed by the session establishment packet receiving module 603, refer to S405 shown in FIGS. 4 and S507 shown in FIG. 5; and establish the new session based on the first session establishment packet and the second session establishment packet, where the first system does not have the capability of filtering the protocol packet for the new session; and a failure analysis module 604, configured to: before the session establishment packet sending module sends the session establishment packet to the second system, perform failure analysis on the failure and obtain a failure analysis result, where for an operation performed by the failure analysis module 604, refer to S503 shown in FIG. 5; and the first system determines a failure cause based on the failure analysis result.

In some embodiments, the first system 600 may further include:

a monitoring channel establishment module 605, configured to establish a monitoring information transmission channel with a session failure analyzer, where for an operation performed by the monitoring channel establishment module 605, refer to S503 shown in FIG. 5;

a monitoring information sending module 606, configured to send monitoring data to the session failure analyzer based on the monitoring information transmission channel, where for an operation performed by the monitoring information sending module 606, refer to S503 shown in FIG. 5;

an analysis information receiving module 607, configured to receive, based on the monitoring information transmission channel, an analysis result sent by the session failure analyzer, where for an operation performed by the analysis information receiving module 607, refer to S503 shown in FIG. 5; and a monitoring channel termination module 608, configured to terminate the monitoring information transmission channel in response to receiving the analysis result, where for an operation performed by the monitoring channel termination module 608, refer to S503 shown in FIG. 5.

In some embodiments, the modules in the first system 600 may be deployed in a same physical device. In some other embodiments, the modules in the first system 600 may be deployed in a plurality of different physical devices. Each module in the first system 600 may be a hardware module or a module combining software and hardware.

It should be understood that, when the system provided in FIG. 6 implements functions of the system, division of the foregoing functional modules is merely used as an example for description. During actual application, the foregoing functions may be allocated to different functional modules for implementation as required. In other words, an internal structure of the system is divided into different functional modules to implement all or some of the functions described above. In addition, the system and method embodiments provided in the foregoing embodiments belong to a same concept. For a specific implementation process, refer to the method embodiments, and details are not described herein again.

Figure 7:
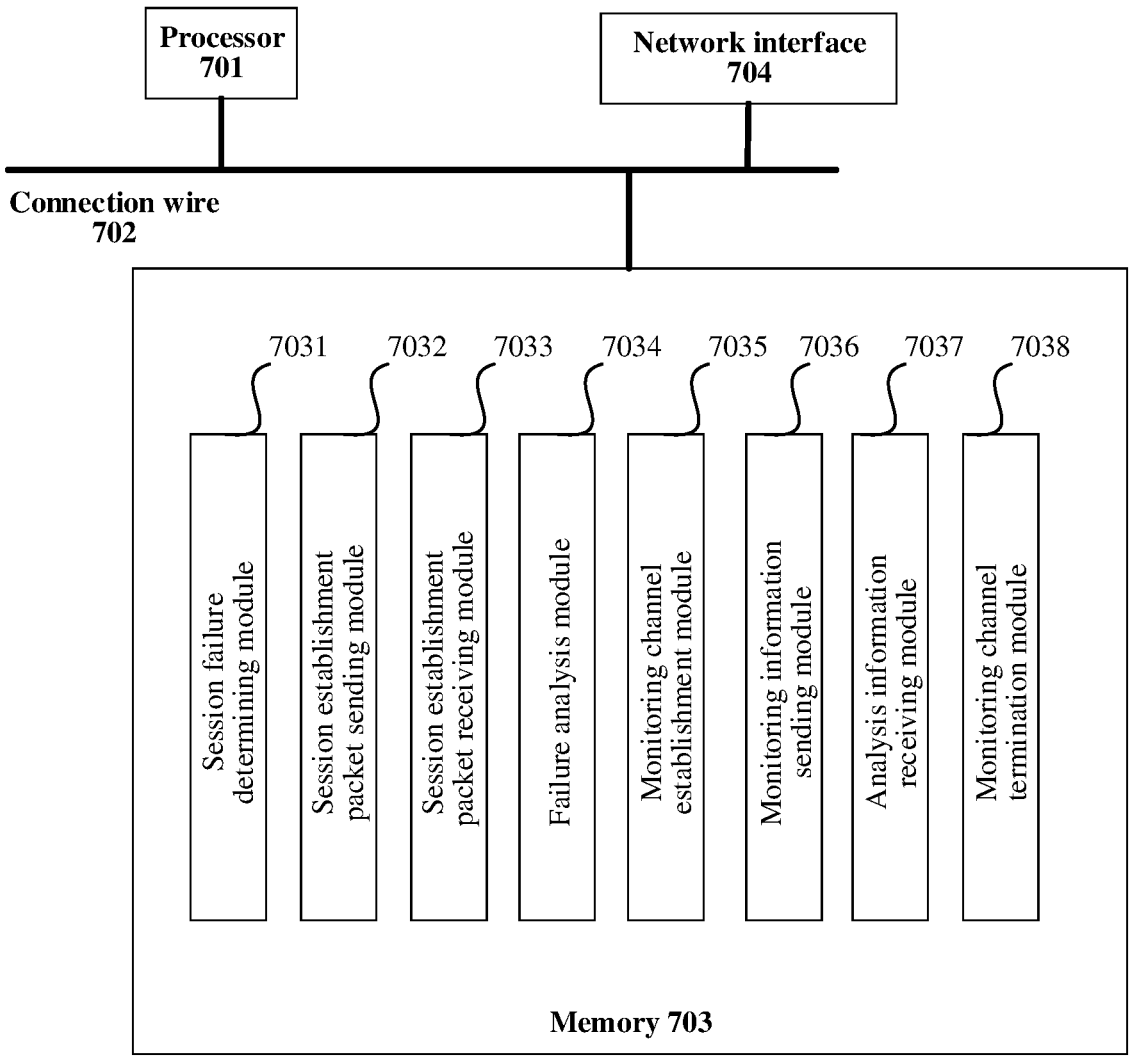
FIG. 7 is a schematic diagram of a first system according to an embodiment of the present disclosure.

FIG. 7 is a schematic structural diagram of a first system 700 according to an embodiment of the present disclosure. The first system 700 shown in FIG. 7 is configured to perform operations related to the method for session protection shown in FIG. 3 to FIG. 5. As shown in FIG. 7, the first system 700 includes at least one processor 701, a connection wire 702, a memory 703, and at least one network interface 704.

The processor 701 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement solutions of the present disclosure. For example, the processor 701 includes an application-specific integrated circuit (ASIC), a programmable logic device (PLD) or another programmable logic device, a transistor logic device, a hardware component, or any combination thereof. The PLD is, for example, a complex programmable logic device (CPLD), a field programmable gate array (FPGA), generic array logic (GAL), or any combination thereof. The processor 701 may implement or execute various logical blocks, modules, and circuits described with reference to content disclosed in embodiments of the present invention. Alternatively, the processor may be a combination of processors implementing a computing function, for example, a combination of one or more microprocessors, or a combination of the DSP and the microprocessor.

The first system 700 may further include a connection wire 702. The connection wire 702 is configured to transfer information between components of the first system 700. A bus may be a peripheral component interconnect (PCI) bus or an extended industry standard architecture (EISA) bus, or the like. Buses may be classified into an address bus, a data bus, a control bus, and the like. For ease of representation, only one bold line is used for representation in FIG. 7, but this does not mean that there is only one bus or only one type of bus.

The memory 703 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 703 exists independently, and is connected to the processor 701 by the bus. Alternatively, the memory 703 may be integrated with the processor 701.

The network interface 704 uses any apparatus such as a transceiver to communicate with another device or a communication network. The communication network may be the Ethernet, a radio access network (RAN), a wireless local area network (WLAN), or the like. The network interface 704 may include a wired communication interface, and may further include a wireless communication interface. Specifically, the network interface 704 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of the present disclosure, the network interface 704 may be used by the first system 700 to communicate with another device.

In specific implementation, in an embodiment, the processor 701 may include one or more CPUs. Each of the processors may be a single-core processor, or may be a multi-core processor. The processor herein may be one or more devices, circuits, and/or processing cores configured to process data (for example, computer program instructions).

In specific implementation, in an embodiment, the first system 700 may include a plurality of processors. Each of the processors may be a single-core processor, or may be a multi-core processor. The processor herein may be one or more devices, circuits, and/or processing cores configured to process data (for example, computer program instructions).

In specific implementation, in an embodiment, the first system 700 may further include an output device and an input device. The output device communicates with the processor 701, and may display information in a plurality of manners. For example, the output device may be a liquid crystal display (LCD), a light emitting diode (LED) display device, a cathode ray tube (CRT) display device, or a projector. The input device communicates with the processor 701, and may receive an input from a user in a plurality of manners. For example, the input device may be a mouse, a keyboard, a touchscreen device, or a sensing device.

In some embodiments, the memory 703 is configured to store a program module and data. The program module includes a session failure determining module 7031, a session establishment packet sending module 7032, a session establishment packet receiving module 7033, a failure analysis module 7034, a monitoring channel establishment module 7035, a monitoring information sending module 7036, an analysis information receiving module 7037, and a monitoring channel termination module 7038. In some embodiments, the modules in the memory 703 in FIG. 7 correspond to the modules shown in FIG. 6. The processor 701 can perform, by executing the computer readable instructions in the modules in the memory 703, operations that can be performed by the modules shown in FIG. 6.

In a specific embodiment, the first system 700 in this embodiment of the present disclosure may be corresponding to the foregoing plurality of embodiments, for example, the first system in the plurality of embodiments corresponding to FIG. 3 to FIG. 5. The processor 701 in the first system 700 reads the instruction in the memory 703, so that the first system 700 shown in FIG. 7 can perform all or some operations performed by the first system in the foregoing plurality of embodiments.

Although a plurality of operations and modules are disclosed in embodiments of the present disclosure, for some technical problems, these operations and modules are not all mandatory. In some embodiments, although an equivalent or similar alternative operation or module of an operation or module is not disclosed, a person skilled in the art can determine an equivalent or similar alternative operation or module of the operation or module based on the disclosed operation or module without creative efforts.

An operation sequence in the specification, claims, and accompanying drawings of the present disclosure is not limited to a specific sequence or sequence in the description. It should be understood that the data used in such a way are simultaneous or may be altered in appropriate circumstances so that the described embodiments can be implemented in order other than the order illustrated or described in the accompanying drawings.

The foregoing one or more technical solutions in embodiments of the present disclosure have at least the following technical effects:

According to the foregoing method provided in embodiments of the present disclosure, after determining that a failure occurs in a session established between a first device and a second device, the first device sends a first session establishment packet to the second device, where the first session establishment packet carries basic capability information of the first device, and a basic capability of the first device does not include a capability of filtering a packet. According to the method, after a session failure occurs, based on a basic capability of session protection, a basic service capability of a network can be quickly restored, thereby avoiding network service interruption caused by the session failure and improving network availability.

The technical solutions provided in the present disclosure are described in detail above. The principle and implementation of the present disclosure are described herein by using specific examples. The description about embodiments is merely provided to help understand the method and core ideas of the present disclosure. In addition, a person of ordinary skill in the art can make variations and modifications to the present disclosure in terms of the specific implementations and application scopes based on the ideas of the present disclosure. Therefore, the content of this specification shall not be construed as a limitation to the present disclosure.

What is claimed is:

1. A method for session protection, comprising:
   determining that a failure occurs in a session between a first device and a second device;
   sending, to the second device after the failure occurs, a first session establishment packet for establishing a new session between the first device and the second device, wherein the first session establishment packet carries capability information of the first device, and the capability information of the first device indicates that the first device does not have a capability of filtering a protocol packet for the new session;
   receiving, after the failure occurs, a second session establishment packet that is sent by the second device for establishing the new session, wherein the second session establishment packet carries capability information of the second device, and the capability information of the second device indicates that the second device does not have the capability of filtering the protocol packet for the new session, and establishing the new session based on the first session establishment packet and the second session establishment packet, wherein the new session does not have the capability of filtering the protocol packet.

2. The method according to claim 1, wherein before the sending, to the second device, a first session establishment packet, the method further comprises:

performing, by the first device, failure analysis on the failure; and determining, by the first device, a failure cause based on the failure analysis.

3. The method according to claim 2, wherein the performing, by the first device, failure analysis on the failure comprises:

establishing a monitoring information transmission channel with a session failure analyzer;

sending monitoring data to the session failure analyzer based on the monitoring information transmission channel;

receiving, based on the monitoring information transmission channel, an analysis result sent by the session failure analyzer; and terminating the monitoring information transmission channel in response to receiving the analysis result.

4. The method according to claim 1, wherein the failure comprises that session termination occurs once and/or that a quantity of times of session termination exceeds a specified threshold within a specified time period.

5. The method according to claim 1, wherein the session is a routing protocol session or a label distribution protocol session.

6. The method according to claim 5, wherein the routing protocol session is a border gateway protocol (BGP) session or an internal gateway protocol (IGP) session.

7. The method according to claim 5, wherein the label distribution protocol session is a label distribution protocol (LDP) session, a resource reservation protocol (RSVP) session, and/or a path computation element communication protocol (PCEP) session.

8. The method according to claim 1, wherein both the first device and the second device are routing devices.

9. An apparatus, comprising:
at least one processor;
at least one non-transitory computer-readable storage medium storing a program including instructions that, when executed by the at least one processor, cause the apparatus to:
determine that a failure occurs in a session between the apparatus and a second device;
send, to the second device after the failure occurs, a first session establishment packet for establishing a new session between the apparatus and the second device, wherein the first session establishment packet carries capability information, and the capability information indicates that the apparatus does not have a capability of filtering a protocol packet for the new session;
receive, after the failure occurs, a second session establishment packet that is sent by the second device for establishing the new session, wherein the second session establishment packet carries capability information of the second device, and the capability information of the second device indicates that the second device does not have the capability of filtering the protocol packet for the new session; and establish the new session based on the first session establishment packet and the second session establishment packet, wherein the new session does not have the capability of filtering the protocol packet.

10. The apparatus according to claim 9, wherein the instructions, when executed by the at least one processor, further cause the apparatus to:

perform failure analysis on the failure; and
determine a failure cause based on the failure analysis.

11. The apparatus according to claim 10, wherein the instructions, when executed by the at least one processor, further cause the apparatus to:

establish a monitoring information transmission channel with a session failure analyzer;

send monitoring data to the session failure analyzer based on the monitoring information transmission channel;

receive, based on the monitoring information transmission channel, an analysis result sent by the session failure analyzer; and terminate the monitoring information transmission channel in response to receiving the analysis result.

12. The apparatus according to claim 9, wherein the failure comprises that session termination occurs once and/or that a quantity of times of session termination exceeds a specified threshold within a specified time period.

13. The apparatus according to claim 9, wherein the session is a routing protocol session or a label distribution protocol session.

14. The apparatus according to claim 13, wherein the routing protocol session is a border gateway protocol (BGP) session or an internal gateway protocol (IGP) session.

15. The apparatus according to claim 13, wherein the label distribution protocol session is a label distribution protocol (LDP) session, a resource reservation protocol (RSVP) session, and/or a path computation element communication protocol (PCEP) session.

16. The apparatus according to claim 9, wherein both the apparatus and the second device are routing devices.

17. A non-transitory storage medium storing a program that, when executed by one or more processors, cause the one or more processors to perform operations comprising:

determining that a failure occurs in a session between a first device and a second device;

sending, to the second device after the failure occurs, a first session establishment packet for establishing a new session between the first device and the second device, wherein the first session establishment packet carries capability information of the first device, and the capability information of the first device indicates that the first device does not have a capability of filtering a protocol packet for the new session;

receiving, after the failure occurs, a second session establishment packet that is sent by the second device for establishing the new session, wherein the second session establishment packet carries capability information of the second device, and the capability information of the second device indicates that the second device does not have the capability of filtering the protocol packet for the new session, and establishing the new session based on the first session establishment packet and the second session establishment packet, wherein the new session does not have the capability of filtering the protocol packet.

* * * * *